United States Patent
Rentfrow

(10) Patent No.: US 12,152,663 B1
(45) Date of Patent: Nov. 26, 2024

(54) TRANSMISSION SUMP ARRANGEMENT

(71) Applicant: Schaeffler Technologies AG & Co. KG, Herzogenaurach (DE)

(72) Inventor: Peter Rentfrow, Doylestown, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/434,960

(22) Filed: Feb. 7, 2024

(51) Int. Cl.
*F16H 57/04* (2010.01)
*B60K 6/40* (2007.10)

(52) U.S. Cl.
CPC ....... *F16H 57/045* (2013.01); *F16H 57/0435* (2013.01); *F16H 57/0436* (2013.01); *F16H 57/0484* (2013.01); *B60K 6/40* (2013.01); *B60Y 2200/92* (2013.01)

(58) Field of Classification Search
CPC . F16H 57/045; F16H 57/0435; F16H 57/0443
See application file for complete search history.

(56) References Cited

U.S. PATENT DOCUMENTS

| | | | |
|---|---|---|---|
| 11,226,032 B2* | 1/2022 | Tanaka | F16H 57/0441 |
| 2009/0107769 A1* | 4/2009 | Sato | B60K 6/365 184/106 |
| 2014/0226988 A1 | 8/2014 | Shao et al. | |
| 2024/0026968 A1* | 1/2024 | Greiter | F16H 57/0457 |

\* cited by examiner

*Primary Examiner* — Derek D Knight

(57) ABSTRACT

A sump arrangement for a transmission includes a first sump arranged for receiving a hydraulic fluid at a first location, a second sump arranged for receiving the hydraulic fluid at a second location, different than the first location, a transmission pump with an inlet, and a valve for selectively hydraulically connecting the inlet to the first sump or to the second sump. The transmission pump is arranged for pumping the hydraulic fluid through the transmission. In some example embodiments, the valve is a spool valve. In an example embodiment, the valve is an inertia valve.

16 Claims, 4 Drawing Sheets

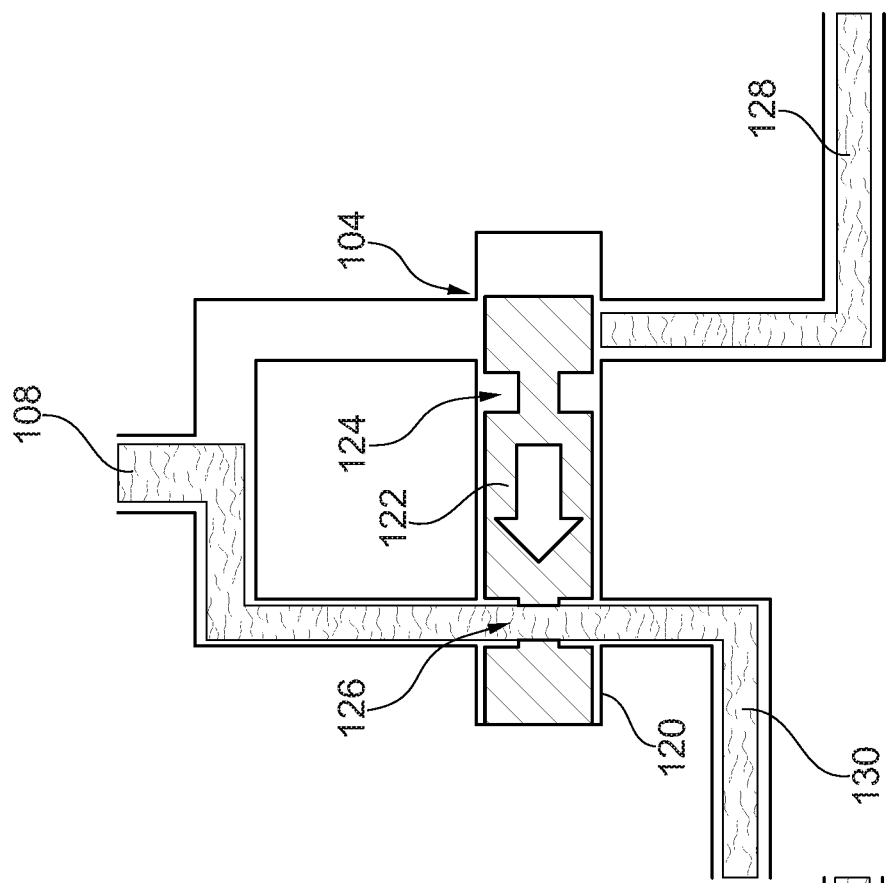
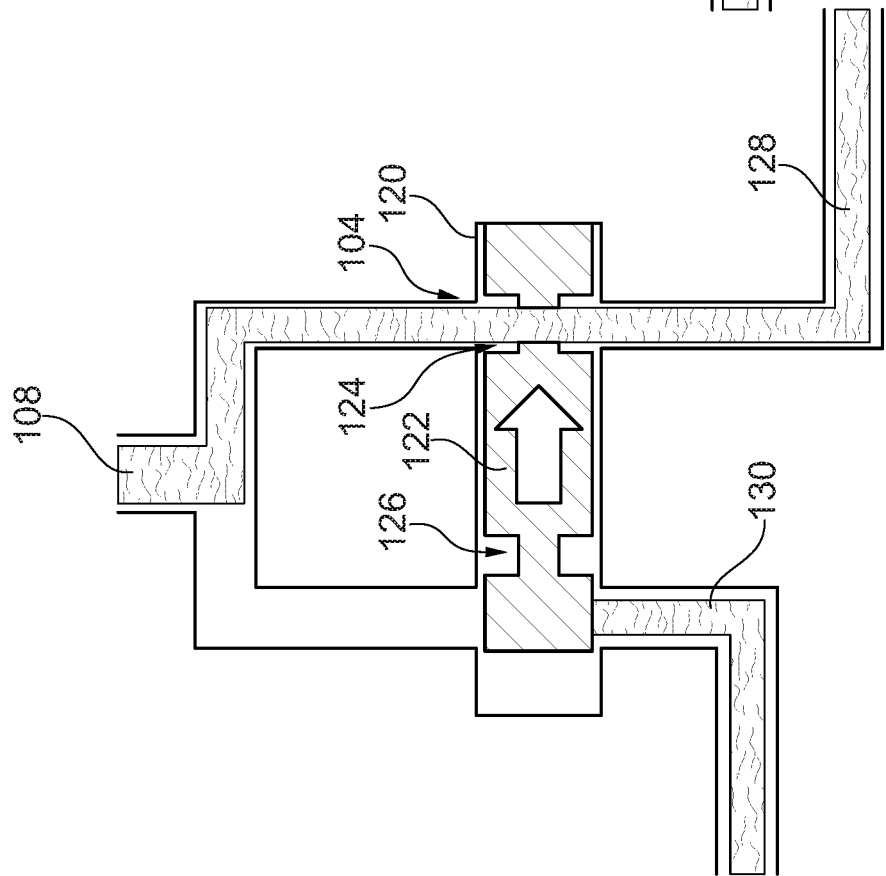

TRANSMISSION SUMP ARRANGEMENT

TECHNICAL FIELD

The present disclosure relates generally to a transmission, and more specifically to a sump arrangement for a transmission.

BACKGROUND

Adjusting a fluid level in a transmission is known. One example is shown and described in United States Patent Publication no. 2014/0026988 titled ACTIVE HYDRAULIC FLUID LEVEL CONTROL FOR AN AUTOMATIC TRANSMISSION to Peterson et al., hereby incorporated by reference as if set forth fully herein.

SUMMARY

Example embodiments broadly comprise a sump arrangement for a transmission including a first sump arranged for receiving a hydraulic fluid at a first location, a second sump arranged for receiving the hydraulic fluid at a second location, different than the first location, a transmission pump with an inlet, and a valve for selectively hydraulically connecting the inlet to the first sump or to the second sump. The transmission pump is arranged for pumping the hydraulic fluid through the transmission. In some example embodiments, the valve is a spool valve. In an example embodiment, the valve is an inertia valve.

In some example embodiments, the valve includes a valve housing and a spool sealed to the valve housing and axially displaceable in the valve housing. The spool includes a first cylindrical groove arranged to selectively hydraulically connect the first sump to the inlet, and a second cylindrical groove arranged to selectively hydraulically connect the second sump to the inlet. In some example embodiments, the sump arrangement also includes a first hydraulic tube hydraulically connecting the valve to the first sump and a second hydraulic tube hydraulically connecting the valve to the second sump. In an example embodiment, the spool is axially displaceable within the valve housing to align the first cylindrical groove with the first hydraulic tube to hydraulically connect the inlet to the first sump, or to align the second cylindrical groove with the second hydraulic tube to hydraulically connect the inlet to the second sump.

In an example embodiment, the sump arrangement also includes a first hydraulic tube hydraulically connecting the valve to the first sump, and a second hydraulic tube hydraulically connecting the valve to the second sump. In some example embodiments, when the transmission is installed in a vehicle, the second location is offset from the first location in a longitudinal running direction of the vehicle. In an example embodiment, the first location is behind the second location in a normal running direction of the vehicle. In an example embodiment, when the transmission is installed in a vehicle, the second location is higher than the first location. In an example embodiment, when the transmission is installed in a vehicle, the valve hydraulically connects the inlet to the first sump during normal operating conditions, and hydraulically connects the inlet to the second sump when the vehicle descends a decline of 25 degrees or more.

Other example embodiments broadly comprise a transmission including the sump arrangement of claim 1. In some example embodiments, the transmission also includes a planetary transmission portion and a hybrid module portion. The first sump is arranged proximate the planetary transmission portion and the second sump is arranged proximate the hybrid module portion. In an example embodiment, the hybrid module portion includes an electric motor/generator. In some example embodiments, the sump arrangement also includes a first hydraulic tube hydraulically connecting the valve to the first sump, and a second hydraulic tube hydraulically connecting the valve to the second sump. In an example embodiment, the transmission also includes a housing, and a portion of the second hydraulic tube extends outside of the housing.

BRIEF DESCRIPTION OF THE DRAWINGS

FIG. 2a illustrates schematic view of a spool valve of the transmission of FIG. 1 shown connecting a first sump to a pump inlet.

FIG. 2b illustrates schematic view of a spool valve of the transmission of FIG. 1 shown connecting a second sump to a pump inlet.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
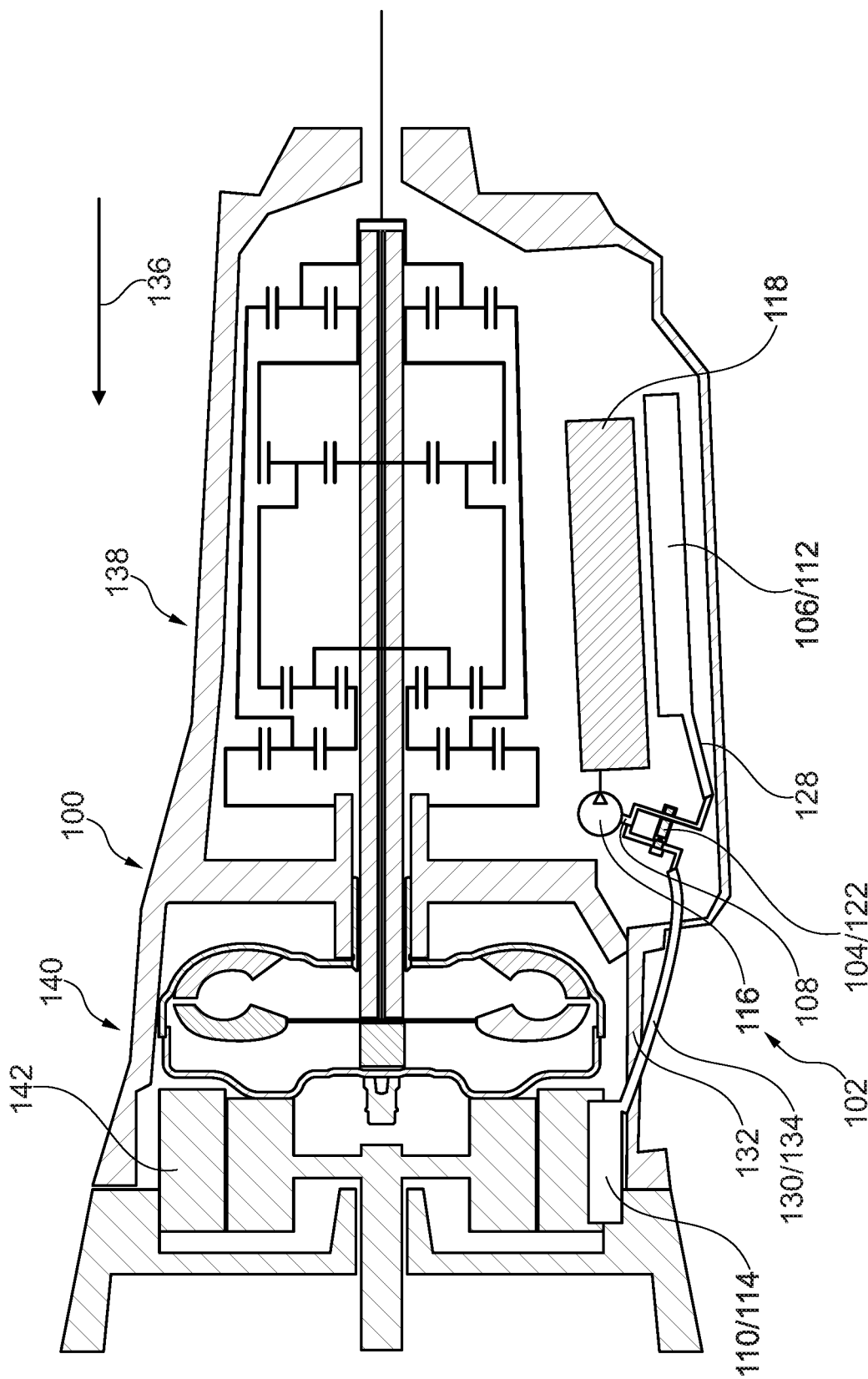
FIG. 1 illustrates a cross-sectional view of a transmission including a transmission sump arrangement according to an example embodiment.

The following description is made with reference to FIGS. 1-2b. FIG. 1 illustrates a cross-sectional view of transmission 100 including transmission sump arrangement 102. FIG. 2a illustrates schematic view of spool valve 104 of transmission 100 of FIG. 1 shown connecting sump 106 to pump inlet 108. FIG. 2b illustrates schematic view of spool valve 104 of transmission 100 of FIG. 1 shown connecting sump 110 to the pump inlet.

Sump arrangement 102 for transmission 100 includes sump 106 arranged for receiving a hydraulic fluid at location 112, and sump 110 arranged for receiving the hydraulic fluid at location 114, different than location 112. Arrangement 102 also includes transmission pump 116 with inlet 108, and valve 104 for selectively hydraulically connecting the inlet to sump 106 or sump 110. The transmission pump is arranged for pumping the hydraulic fluid through valve body 118 to the transmission in a known manner. As shown in the figures, valve 104 is a spool valve, although arrangement 102 may include an alternative valve type. For example, in other embodiments, valve 104 may be another valve type and/or may be activated actively or passively. In the embodiments shown, valve 104 is an inertia valve. That is, the valve is actuated by gravity when the vehicle descends a steep grade or by acceleration when the vehicle is decelerating, as described below.

Valve 104 includes valve housing 120 and spool 122 sealed to the valve housing and axially displaceable in the valve housing. Spool 122 includes cylindrical groove 124 arranged to selectively hydraulically connect sump 106 to the inlet and cylindrical groove 126 arranged to selectively hydraulically connect sump 110 to the inlet. That is, when the spool is aligned in the housing in a first position, cylindrical groove 124 allows fluid through the valve between the inlet and sump 106, and cylindrical groove 126 sealed in the valve housing, preventing fluid flow between the inlet and sump 110. But when the spool is axially displaced in the housing (e.g., by gravity, acceleration, or another active or passive actuating method), groove 126 allows fluid through the valve between the inlet and sump 110, and groove 124 is sealed in the valve housing. Arrangement 102 also includes hydraulic tube 128 hydraulically connecting the valve to sump 106 and hydraulic tube 130 hydraulically connecting the valve to sump 110. As discussed above, the spool is axially displaceable within the valve housing to align cylindrical groove 124 with hydraulic tube 128 to hydraulically connect the inlet to sump 106 or to align cylindrical groove 126 with hydraulic tube 130 to hydraulically connect the inlet to sump 110. Transmission 100 includes housing 132 and portion 134 of hydraulic tube 130 extends outside of the housing.

Figure 3:
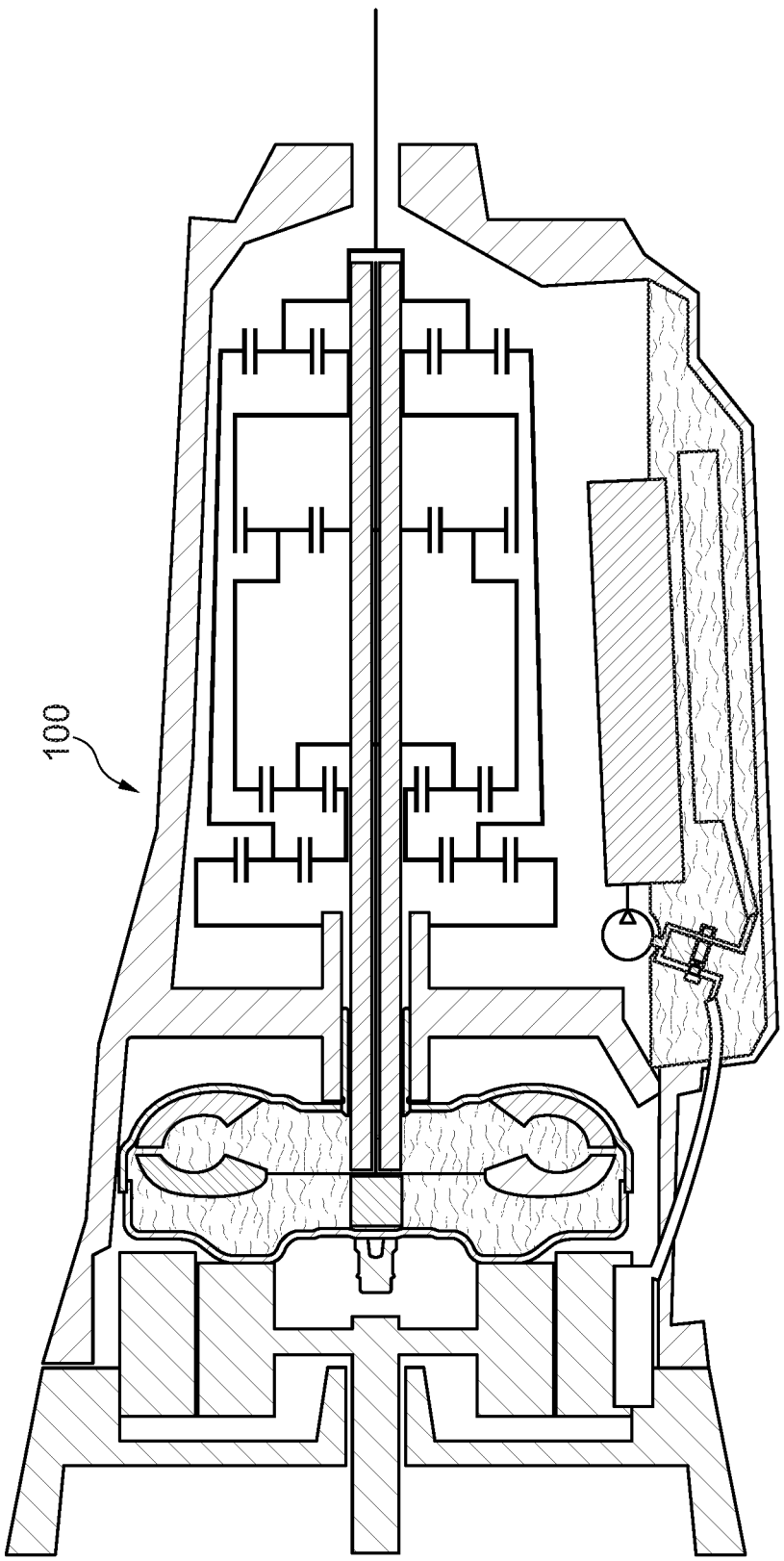
FIG. 3 illustrates a cross-sectional view of the transmission of FIG. 1 showing a hydraulic fluid level during normal operation.
Figure 4:
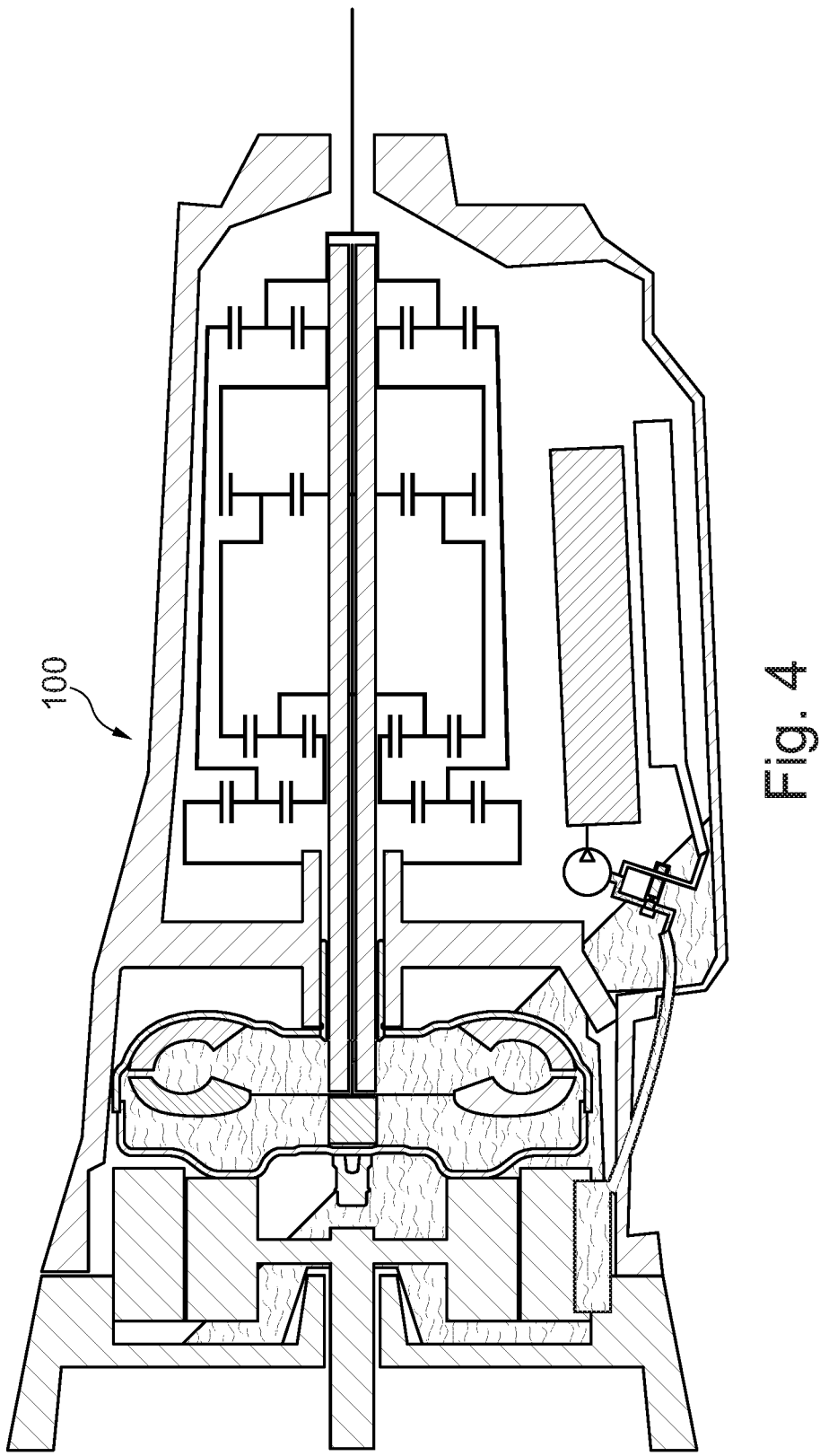
FIG. 4 illustrates a cross-sectional view of the transmission of FIG. 1 showing a hydraulic fluid level during hard deceleration or when traveling down a steep slope.

The following description is made with reference to FIGS. 1-4. FIG. 3 illustrates a cross-sectional view of the transmission of FIG. 1 showing a hydraulic fluid level during normal operation. FIG. 4 illustrates a cross-sectional view of the transmission of FIG. 1 showing a hydraulic fluid level during hard deceleration or when traveling down a steep slope. When the transmission is installed in a vehicle, for example, location 114 is offset from location 112 in longitudinal running direction 136 of the vehicle. Location 112 is behind location 114 in a normal running direction of the vehicle. When the transmission is installed in a vehicle, location 114 is higher than location 112 and the valve hydraulically connects the inlet to sump 106 during normal operating conditions (as shown in FIG. 3, for example) and hydraulically connects the inlet to sump 110 when the vehicle descends a decline of 25 degrees or more (as shown in FIG. 4, for example). That is, as discussed above, the valve is arranged such that steep descents will shift the valve so that the inlet draws fluid from sump 110 instead of sump 106 which may have insufficient fluid due to the angle of operation of the transmission. Such a condition is shown, for example, in FIG. 4.

Transmission 100 also includes planetary transmission portion 138 hybrid module portion 140. Sump 106 is arranged proximate the planetary transmission portion and sump 110 is arranged proximate the hybrid module portion. Hybrid module portion 140 includes electric motor/generator 142. That is, the transmission may be a combination of a conventional planetary automatic transmission and a hybrid module, enabling electric driving or boosting with the electric motor, as well as battery charging from the engine and/or during vehicle deceleration. Because the hydraulic fluid circulates through both portions of the transmission, the fluid may be concentrated in one portion or another during the various operating events of the vehicle. By allowing the transmission pump to pull fluid from two different sumps, the valve permits improved operation of the vehicle in more operating conditions.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, case of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Transmission
102 Transmission sump arrangement
104 Spool valve
106 Sump (first)
108 Pump inlet
110 Sump (second)
112 Location (first)
114 Location (second)
116 Transmission pump
118 Valve body
120 Valve housing
122 Spool
124 Cylindrical groove (first)
126 Cylindrical groove (second)
128 Hydraulic tube (first)
130 Hydraulic tube (second)
132 Housing (transmission)
134 Portion (hydraulic tube 130)

136 Longitudinal running direction of vehicle
138 Planetary transmission portion (transmission)
140 Hybrid module portion (transmission)
142 Electric motor/generator (hybrid module portion)

What is claimed is:

1. A sump arrangement for a transmission, comprising:
   a first sump arranged for receiving a hydraulic fluid at a first location;
   a second sump arranged for receiving the hydraulic fluid at a second location, different than the first location;
   a transmission pump comprising an inlet, the transmission pump arranged for pumping the hydraulic fluid through the transmission; and
   a valve for selectively hydraulically connecting the inlet to the first sump or to the second sump.

2. The sump arrangement of claim 1 wherein the valve is a spool valve.

3. The sump arrangement of claim 2 wherein the valve is an inertia valve.

4. The sump arrangement of claim 1 wherein the valve comprises:
   a valve housing; and
   a spool sealed to the valve housing and axially displaceable in the valve housing, the spool comprising:
      a first cylindrical groove arranged to selectively hydraulically connect the first sump to the inlet; and
      a second cylindrical groove arranged to selectively hydraulically connect the second sump to the inlet.

5. The sump arrangement of claim 4 further comprising:
   a first hydraulic tube hydraulically connecting the valve to the first sump; and
   a second hydraulic tube hydraulically connecting the valve to the second sump.

6. The sump arrangement of claim 5 wherein the spool is axially displaceable within the valve housing:
   to align the first cylindrical groove with the first hydraulic tube to hydraulically connect the inlet to the first sump; or
   to align the second cylindrical groove with the second hydraulic tube to hydraulically connect the inlet to the second sump.

7. The sump arrangement of claim 1 further comprising:
   a first hydraulic tube hydraulically connecting the valve to the first sump; and
   a second hydraulic tube hydraulically connecting the valve to the second sump.

8. The sump arrangement of claim 1 wherein, when the transmission is installed in a vehicle, the second location is offset from the first location in a longitudinal running direction of the vehicle.

9. The sump arrangement of claim 8 wherein the first location is behind the second location in a normal running direction of the vehicle.

10. The sump arrangement of claim 1 wherein, when the transmission is installed in a vehicle, the second location is higher than the first location.

11. The sump arrangement of claim 1 wherein, when the transmission is installed in a vehicle, the valve:
    hydraulically connects the inlet to the first sump during normal operating conditions; and
    hydraulically connects the inlet to the second sump when the vehicle descends a decline of 25 degrees or more.

12. A transmission comprising the sump arrangement of claim 1.

13. The transmission of claim 12 further comprising:
    a planetary transmission portion; and
    a hybrid module portion, wherein:
       the first sump is arranged proximate the planetary transmission portion; and
       the second sump is arranged proximate the hybrid module portion.

14. The transmission of claim 13 wherein the hybrid module portion comprises an electric motor/generator.

15. The transmission of claim 13 wherein the sump arrangement further comprises:
    a first hydraulic tube hydraulically connecting the valve to the first sump; and
    a second hydraulic tube hydraulically connecting the valve to the second sump.

16. The transmission of claim 15 further comprising a housing, wherein a portion of the second hydraulic tube extends outside of the housing.

* * * * *